United States Patent
Ohashi et al.

(10) Patent No.: US 10,666,111 B2
(45) Date of Patent: May 26, 2020

(54) ROTARY ELECTRIC MACHINE

(71) Applicant: Mitsubishi Electric Corporation, Tokyo (JP)

(72) Inventors: Naoki Ohashi, Tokyo (JP); Shoichiro Nishitani, Tokyo (JP); Keisuke Murase, Tokyo (JP); Akihiro Yamamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 238 days.

(21) Appl. No.: 15/553,598

(22) PCT Filed: Apr. 27, 2015

(86) PCT No.: PCT/JP2015/062685
§ 371 (c)(1),
(2) Date: Aug. 25, 2017

(87) PCT Pub. No.: WO2016/174711
PCT Pub. Date: Nov. 3, 2016

(65) Prior Publication Data
US 2018/0048207 A1    Feb. 15, 2018

(51) Int. Cl.
*H02K 5/20* (2006.01)
*H02K 15/14* (2006.01)
(Continued)

(52) U.S. Cl.
CPC .............. *H02K 5/20* (2013.01); *H02K 9/16* (2013.01); *H02K 15/14* (2013.01); *H02K 9/19* (2013.01); *H02K 2201/03* (2013.01)

(58) Field of Classification Search
CPC .. H02K 5/20; H02K 9/16; H02K 9/19; H02K 2201/03
(Continued)

(56) References Cited

U.S. PATENT DOCUMENTS 5,923,108 A *  7/1999  Matake .................. H02K 5/128
                                                          310/71
8,456,046 B2 *  6/2013  Bradfield ................. H02K 9/19
                                                          310/52
(Continued)

FOREIGN PATENT DOCUMENTS

JP         6-088170 U    12/1994
JP         10-052002 A    2/1998
(Continued)

OTHER PUBLICATIONS

International Search Report for PCT/JP2015/062685 dated Jul. 28, 2015 [PCT/ISA/210].
(Continued)

*Primary Examiner* — Gary A Nash
(74) *Attorney, Agent, or Firm* — Sughrue Mion, PLLC; Richard C. Turner

(57) ABSTRACT

This invention is concerning a rotary electric machine 1, this electric motor 1 being provided with an inner cylinder 2, a rotor 3 provided so as to be rotatable inside the inner cylinder 2, a stator 4 fixed to the inner cylinder 2 and separated via a gap from an outer periphery of the rotor 3, and an outer cylinder 8 that covers an entire periphery of the inner cylinder 2 and forms a space 15, which serves as a coolant passage, in conjunction with the inner cylinder 2, wherein both ends of the inner cylinder 2 and the outer cylinder 8 in an axial direction are fixed to each other by cylinder welding portions 9 formed by welding. Accordingly, a rotary electric machine that is small and light can be obtained at low cost.

5 Claims, 3 Drawing Sheets

(51) Int. Cl.
*H02K 9/16* (2006.01)
*H02K 9/19* (2006.01)

(58) Field of Classification Search
USPC ............... 310/52, 53, 57, 60 A, 89
See application file for complete search history.

(56) References Cited

U.S. PATENT DOCUMENTS

| | | | |
|---|---|---|---|
| 8,519,581 B2* | 8/2013 | Bradfield | H02K 9/19 310/52 |
| 2008/0223557 A1* | 9/2008 | Fulton | H02K 5/20 165/104.33 |
| 2011/0037353 A1 | 2/2011 | Rantapaa | |
| 2011/0298315 A1* | 12/2011 | Fulton | H02K 5/20 310/54 |
| 2012/0306312 A1* | 12/2012 | Endo | H02K 1/185 310/216.113 |
| 2013/0209239 A1* | 8/2013 | Karlsson | H02K 5/20 415/117 |
| 2015/0069862 A1* | 3/2015 | Bulatow | H02K 5/04 310/43 |
| 2016/0126799 A1* | 5/2016 | Ohashi | H02K 5/20 310/64 |

FOREIGN PATENT DOCUMENTS

| | | |
|---|---|---|
| JP | 2001-086667 A | 3/2001 |
| JP | 2002-186215 A | 6/2002 |
| JP | 5136069 B2 | 2/2013 |
| JP | 2013-054980 A | 3/2013 |

OTHER PUBLICATIONS

Communication dated Feb. 28, 2020, issued by the German Patent Office in German Application No. 112015006496.6.

* cited by examiner

ROTARY ELECTRIC MACHINE

CROSS REFERENCE TO RELATED APPLICATIONS

This application is a National Stage of International Application No. PCT/JP2015/062685, filed on Apr. 27, 2015, the contents of all of which are incorporated herein by reference in their entirety.

TECHNICAL FIELD

The present invention relates to a rotary electric machine provided with an inner cylinder which includes a stator fixed to an inner wall surface thereof, and an outer cylinder which covers the entire circumference of the inner cylinder and forms a space, that is, a coolant passage, in conjunction with the inner cylinder.

BACKGROUND ART

Conventionally, rotary electric machines are known in which a space is provided between a inner cylinder that supports a stator core and an outer cylinder that further encloses the inner cylinder, and in which cooling of the stator core is performed by allowing cooling water to flow through the space (see PTL 1, for example).

In this case, both end portions of the inner cylinder and the outer cylinder are sealed around the entire circumference using O-rings in order to ensure airtightness in the cooling passage (see PTL 1, for example).

CITATION LIST

Patent Literature

[PTL 1] Japanese Patent No. 5136069

SUMMARY OF INVENTION

Technical Problem

However when these O-rings are used, a compression margin thereof has to be properly controlled in order to ensure airtightness, hence a high level of accuracy is required in processing and assembling the inner cylinder and the outer cylinder, which leads to the problem of escalated manufacturing costs.

Further, in general, larger amounts of material are wasted as the size of O-rings manufactured by die molding increases, such that the O-rings become more expensive due to low production efficiency and, particularly when O-rings are applied to large electric motors, such as electric motors used in automobiles, the cost thereof rises dramatically.

Moreover, O-ring installation grooves must be processed in the inner cylinder and the outer cylinder in order to install the O-rings and, in order for the O-rings to be supported by these grooves and to maintain airtightness, processing of the grooves must be highly accurate and the grooves must have a low surface roughness, generally necessitating machine processing, which also leads to the problem of escalated manufacturing costs.

In addition, in order to secure grooves in the inner cylinder or the outer cylinder, a wall thickness of the inner cylinder or the outer cylinder has to be increased, which leads to the problems of increased size and increased weight.

The present invention is intended to solve such problems, and an object thereof is to obtain a rotary electric machine that can be made small and light at low cost.

Solution to Problem

A rotary electric machine according to the present invention is a rotary electric machine provided with an inner cylinder, a rotor provided so as to be rotatable inside the inner cylinder, a stator fixed to the inner cylinder and separated via a gap from an outer circumference of the rotor, and an outer cylinder that covers an entire circumference of the inner cylinder and forms a space, which serves as a coolant passage, in conjunction with the inner cylinder, wherein both ends of the inner cylinder and the outer cylinder in an axial direction are fixed to each other by cylinder welding portions formed by welding.

Advantageous Effects of Invention

With the rotary electric machine according to the present invention, both end portions of an inner cylinder and an outer cylinder in an axial direction are fixed to each other by cylinder welding portions formed by welding, allowing a reduction in size and weight to be achieved at low cost.

DESCRIPTION OF EMBODIMENTS

Figure 1:
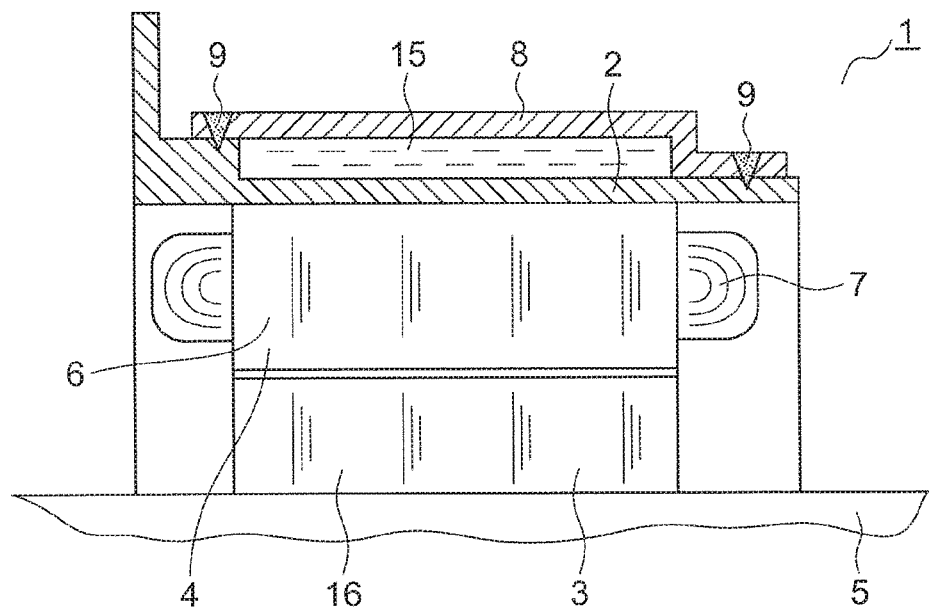
FIG. 1 is a schematic upper side cross-sectional view taken from the side showing an electric motor according to a first embodiment of the present invention.

Electric motors of each embodiment of the rotary electric machine according to the present invention will be described hereinafter with reference to the drawings. In each of the drawings, identical or corresponding members and parts will be denoted by identical reference numerals.

Embodiment 1

FIG. 1 is a schematic upper side cross-sectional view taken from the side of an electric motor 1 to be installed in, for example, a hybrid vehicle, an electric vehicle, or the like, according to a first embodiment of the present invention.

The electric motor 1 is provided with an inner cylinder 2, a rotor 3 provided so as to be rotatable inside the inner cylinder 2, a cylindrical stator 4 fixed to the inner cylinder 2 and separated from an outer circumference of the rotor 3 via a gap, and an outer cylinder 8 that covers the entire circumference of the inner cylinder 2 and forms a space 15, which serves as a coolant passage, in conjunction with the inner cylinder 2.

The inner cylinder 2 and the outer cylinder 8 are respectively made of iron, and are formed by sheet metal die molding.

The rotor 3 is provided with a shaft 5 which is supported at both ends via bearings (not shown) so as to be freely rotatable with respect to the inner cylinder 2, a rotor core 16 which is fitted to the shaft 5 and laminated with a thin steel plate, and permanent magnets (not shown) which are embedded in the rotor core 16 at equally spaced intervals in the circumferential direction. These rectangular permanent magnets constitute magnetic poles.

The stator 4 includes a cylindrical stator core 6 and stator coils 7 which are wound around the stator core 6 via an insulator (not shown).

The stator 4 is supported by the shrink-fitted or press-fitted inner cylinder 2.

One side of the inner cylinder 2 is folded towards an outer side in a radial direction around an entire circumference. One side of the outer cylinder 8, the wall thickness of which is thinner than that of the inner cylinder 2, is folded in a step-like manner.

Both end portions of the inner cylinder 2 in the axial direction are respectively in contact with both end portions of the outer cylinder 8 in the axial direction. Both end portions of the inner cylinder 2 and the outer cylinder 8 in the axial direction are fixed to each other by cylinder welding portions 9 formed by laser punch welding, in which a laser is radiated towards the inner cylinder 2 from the outer cylinder 8, such that the airtightness of the space 15 is secured by the cylinder welding portions 9, which extend around the entire circumference.

In the electric motor 1 according to this embodiment, a current flows through a power supply unit (not shown) to the stator coils 7.

As a result, a rotating magnetic field is generated in the stator 4 and, as a result of the rotor 3 rotating due to being pulled by the rotating magnetic field, the shaft 5, which is integral to the rotor 3, also rotates, and torque thereof is transmitted to the outside.

Further, coolant flows into the space 15 formed around the entire circumference by the inner cylinder 2 and the outer cylinder 8 and, due to the exchange of heat between the coolant and the stator core 6 having generated heat due the rotating magnetic field, the stator 4 is cooled.

In the electric motor 1 according to this embodiment, both end portions of the inner cylinder 2 and the outer cylinder 8 are fixed to each other by laser punch welding, thereby securing the airtightness of the space 15.

Accordingly, additional sealing members such as O-rings are not necessary to secure the airtightness of both end portions of the inner cylinder 2 and the outer cylinder 8.

In particular, when O-rings having a large diameter are manufactured using a die, a quantity thereof manufactured by a single die is limited, which results in increased manufacturing costs, hence, the cost reduction effect of seal members not being required is significant.

Further, as it is not necessary to subject the inner cylinder 2 or the outer cylinder 8 to groove processing in order to support the O-rings between the inner cylinder 2 and the outer cylinder 8, processing costs are also reduced.

Moreover, as grooves are unnecessary and the wall thicknesses of the inner cylinder 2 and the outer cylinder 8 can be made thinner, the inner cylinder 2 and the outer cylinder 8 can be manufactured by sheet metal die molding, the processing costs of which are low and which enables highly accurate manufacturing.

In addition, as the inner cylinder 2 and the outer cylinder 8 are manufactured from sheet metal which has a thin wall thickness, the electric motor 1 can be made smaller and lighter, and the efficiency of heat exchange between the coolant and the stator core 6 having generated heat due to the rotating magnetic field is improved.

Further, the stator 4 is integrated with the inner cylinder 2 by shrink-fitting or press-fitting, which limits iron loss of the stator 4 caused by the tightening force associated with shrink-fitting or press-fitting, hence deterioration in the performance of the electric motor 1 can be prevented.

Moreover, as a laser is radiated from the outer cylinder 8 having a thin wall thickness towards the inner cylinder 2 having a thick wall thickness, the inner cylinder 2 also melts within a short period of time, such that punching properties of the laser are improved.

Embodiment 2

Figure 2:
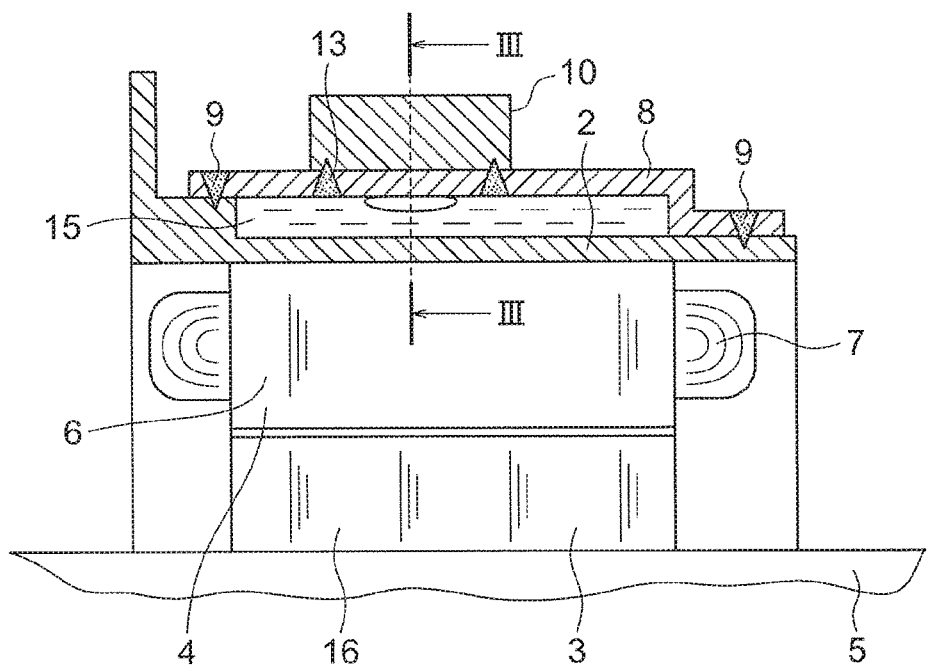
FIG. 2 is a schematic upper side cross-sectional view taken from the side showing an electric motor according to a second embodiment of the present invention.
Figure 3:
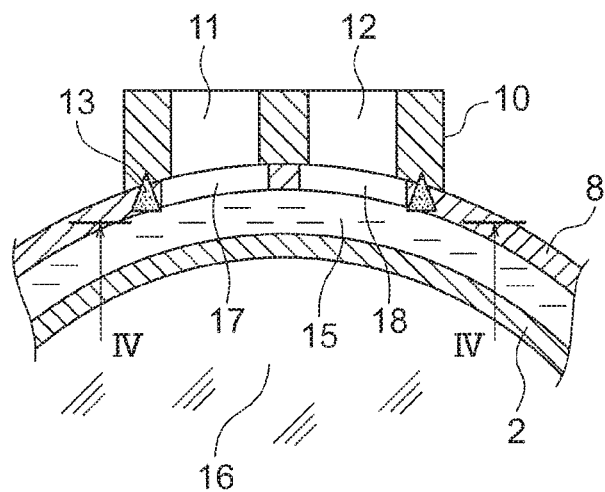
FIG. 3 is an arrow-perspective cross-sectional view taken along the III-III line shown in FIG. 2.
Figure 4:
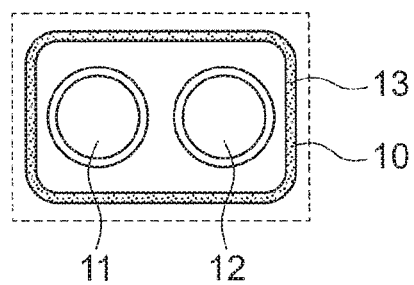
FIG. 4 is a view of a pipe taken along the IV-IV line shown in FIG. 3.

FIG. 2 is a schematic upper side cross-sectional view taken from the side showing an electric motor 1 according to a second embodiment of the present invention. FIG. 3 is an arrow-perspective cross-sectional view taken along the III-III line shown in FIG. 2. FIG. 4 is a view of a pipe 10 taken along the IV-IV line shown in FIG. 3.

In this embodiment, a pipe 10 is provided at the top of the outer cylinder 8.

An inflow port 17 and a discharge port 18 for coolant are formed in the outer cylinder 8. The pipe 10 includes an inflow port 11 and a discharge port 12 for coolant.

The pipe 10 is in contact with the outer cylinder 8 from the outside of the outer cylinder 8 such that the inflow ports 17 and 11 and the discharge ports 18 and 12 overlap each other. A pipe welding portion 13 is formed by laser punch welding, in which a laser is radiated from the outer cylinder 8 towards the pipe 10, of an edge extending around the entire circumference of the pipe 10, so as to surround the inflow ports 17 and 11 and the discharge ports 18 and 12 from the inner side of the outer cylinder 8. Airtightness between the outer cylinder 8 and the pipe 10 is secured by the pipe welding portion 13 formed on the edge extending around the entire circumference of the pipe 10.

Note that the pipe 10 may also be welded from the outside of the outer cylinder 8. Moreover, when the inflow port and the discharge port for coolant are formed in the outer cylinder 8 so as to be separate from each other, air tightness is secured by separate laser punch welding, in which a laser is radiated through the outer cylinder 8, of a pipe that includes an inflow port and a pipe that includes a discharge port.

Other configurations are the same as those of the electric motor 1 according to the first embodiment.

Incidentally, rotary electric machines are known in which a hole is formed in an outer cylinder and a nipple through which coolant passes is screwed into the hole and fixed to the outer cylinder (see, for example, Japanese Patent Application Publication No. 2009-247085).

In the case of this rotary electric machine, the outer cylinder needs to have a wall thickness that is thick enough for a screw thread to be cut, hence, the outer cylinder cannot be manufactured by sheet metal die molding.

In addition, a sealing member such as an O-ring, a gasket, or the like must be interposed between the outer cylinder and the nipple, resulting in an increase in the number of assembly steps and the number of parts.

However, with the electric motor 1 according to this embodiment, the pipe 10 is in contact with the outer cylinder 8 and is fixed to the outer cylinder 8 by performing laser punch welding, in which a laser is radiated through the outer cylinder 8, so as to surround the inflow ports 17 and 11 and the discharge ports 18 and 12 from the inside of the outer cylinder 8.

Accordingly, a screw portion on the pipe 10 for screwing and fixing the pipe 10 to the outer cylinder 8 is unnecessary, and the cost of the pipe 10 itself is reduced.

Further, the outer cylinder 8 does not require space for a screw hole used to fix the pipe 10 thereto, that is, the wall thickness thereof does not need to be thick, and the outer cylinder 8 can be manufactured by die molding of sheet metal having a thin wall thickness, which has a low processing cost and allows for highly accurate manufacturing.

In addition, as the outer cylinder 8 is manufactured from sheet metal having a thin wall thickness, weight reduction can be achieved.

Moreover, as it becomes unnecessary to add a seal member between the pipe 10 and the outer cylinder 8, cost is reduced.

Further, common laser welding equipment can be used to fix together the inner cylinder 2 and the outer cylinder 8, and the pipe 10 and the outer cylinder 8.

Embodiment 3

Figure 5:
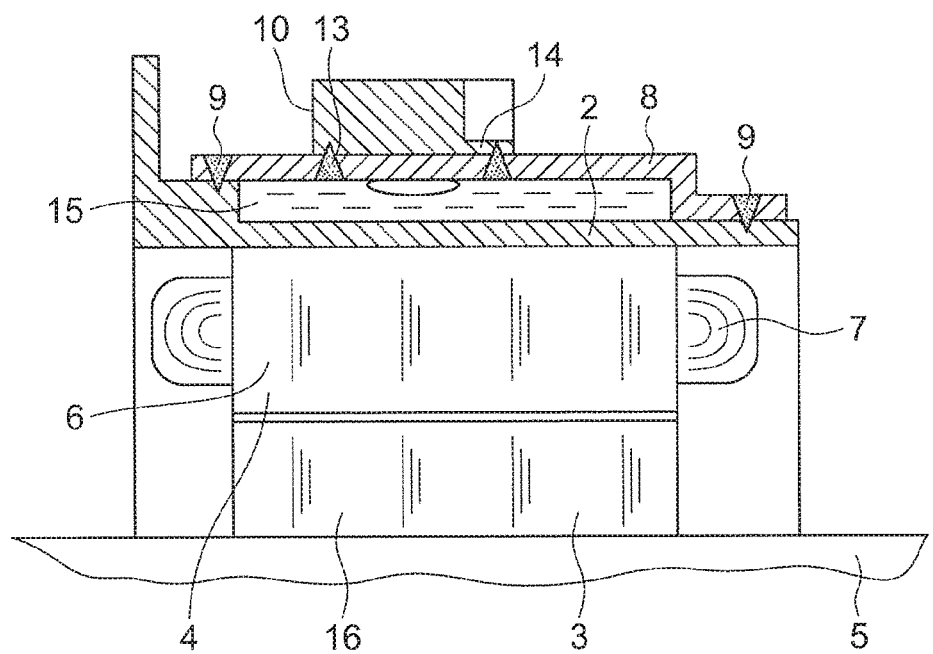
FIG. 5 is a schematic upper side cross-sectional view taken from the side showing an electric motor according to a third embodiment of the present invention.

FIG. 5 is a schematic upper side cross-sectional view taken from the side showing an electric motor 1 according to a third embodiment of the present invention.

In this embodiment, a thin portion 14 is formed on a portion of the edge extending around the entire circumference of the pipe 10. The thin portion 14 corresponds to an area of the pipe welding portion 13 formed at the edge extending around the entire circumference of the pipe 10 between the inflow port 11 and the discharge port 12 of the pipe 10.

Note that the thin portion 14 may also be formed on the edge extending around the entire circumference of the pipe 10.

Other configurations are the same as those of the electric motor 1 according to the second embodiment.

With the electric motor according to this embodiment, it is possible to visually observe, through the thin portion 14, a welding bead generated by laser punch welding, such that it is possible to visually confirm a sudden welding fault such as a malfunction with the laser welding machine.

Note that, in each of the embodiments described above, the inner cylinder 2 and the outer cylinder 8, which are made of iron, are formed by sheet metal die molding, however the inner cylinder 2 and the outer cylinder 8 may also be formed by, for example, casting or forging, and may also be made from a material other than iron, aluminium for example.

Further, laser punch welding is one example, and arc welding or gas welding, for example, may also be used.

Moreover, the present invention can be applied to a generator or a motor-generator as well as an electric motor.

REFERENCE SIGNS LIST

1 Electric motor
2 Inner cylinder
3 Rotor
4 Stator
5 Shaft
6 Stator core
7 Stator coil
8 Outer cylinder
9 Cylinder welding portion
10 Pipe
11, 17 Inflow port
12, 18 Discharge port
13 Pipe welding portion
14 Thin portion
15 Space
16 Rotor core

The invention claimed is:

1. A rotary electric machine comprising:
an inner cylinder;
a rotor provided so as to be rotatable inside the inner cylinder;
a stator fixed to the inner cylinder and separated via a gap from an outer circumference of the rotor; and
an outer cylinder that covers an entire circumference of the inner cylinder and forms a space, which serves as a coolant passage, in conjunction with the inner cylinder, wherein
both ends of the inner cylinder and the outer cylinder in an axial direction are fixed to each other by laser punch-welded cylinder welding portions.

2. The rotary electric machine of claim 1, wherein the outer cylinder and a pipe that communicates with the space, are fixed to each other, at a peripheral edge portion of the pipe, by a pipe welding portion formed by welding.

3. The rotary electric machine of claim 2, wherein a thin portion is formed at the peripheral edge portion of the pipe.

4. The rotary electric machine of claim 1, wherein in the laser punch welding, a laser is radiated from one of the thinner wall thickness of the inner cylinder and the outer cylinder towards the other cylinder.

5. The rotary electric machine of claim 1, wherein the inner cylinder and the outer cylinder are formed by sheet metal die molding.

* * * * *